United States Patent Office 3,248,656
Patented Apr. 26, 1966

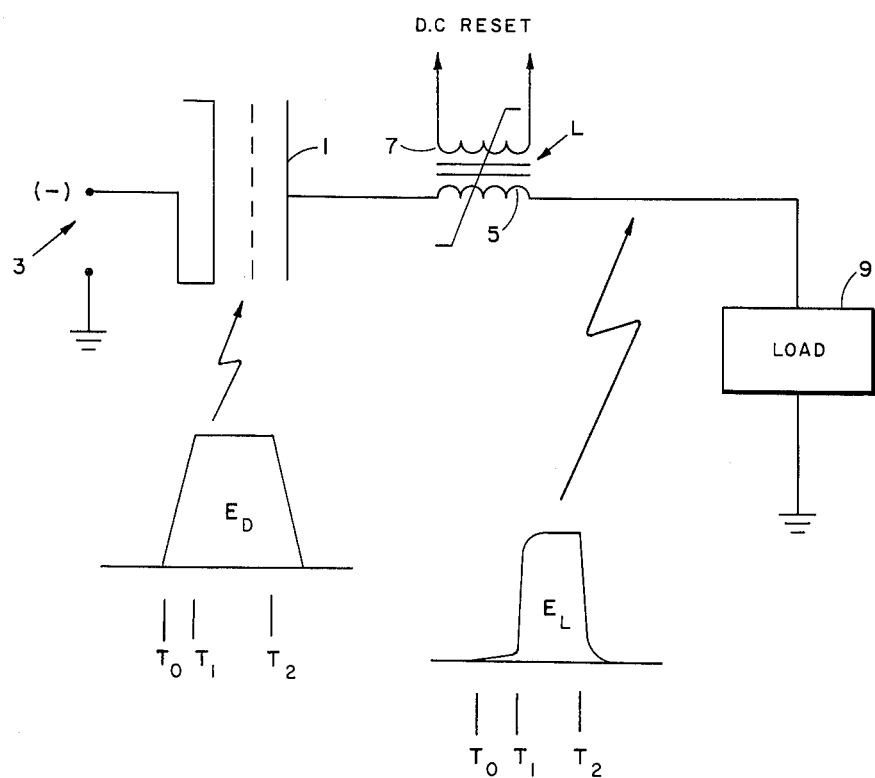

3,248,656
RISE TIME ENHANCING REACTOR
John R. Caswell, Lincoln, Mass., assignor, by mesne assignments, to the United States of America as represented by the Secretary of the Army
Filed June 16, 1964, Ser. No. 375,679
1 Claim. (Cl. 328—34)

This invention relates to the application of a saturable reactor to a pulse modulator for the purpose of enhancing or decreasing the rise time of a video pulse applied to a real load.

In pulse radar transmitters it is required to apply a gate pulse or turn on pulse to an electron device, usually a microwave generator or amplifying tube. The turn on pulse may be applied to the cathode or emitter end of such a device (beam pulsing) or may be applied to a control element in the device to accomplish activation of the device. Practical devices present substantial amounts of capacity to the pulse source with the result that pulse rise time is degraded. In addition, the practical circuits generating the pulse cannot produce an ideal or infinite rise time pulse, with the result that the achievable rise time at the load is, in general, the square root of the sum of the squares of the individual rise times involved.

The modulator circuits to which this invention is applicable are either hard tube circuits, soft tube or line type, and semi-conductor circuits of both types. All are of reasonably high power capability. In hard tube circuits a number of stages are required to develop the output pulse and each stage adds degradation to the achievable output pulse rise time. Pulse transformers also tend to limit rise time. In line type circuits both pulse transformers and inherent breakdown times of the switching device limit rise time.

This invention utilizes a saturable reactor in series with the load of a pulse driver in order to shape said pulse. The reactor is initially a high impedance to the pulse as compared to the load, and therefore the majority of the pulse voltage at the time of switch firing is developed across the reactor and not the load. When the voltage across the reactor reaches a predetermined level, the reactor saturates. The transformation from high impedance to low impedance can be made very fast (in the order of .050 microsecond). The impedance change redivides the voltage between the load and the reactor such that the majority of the voltage appears across the load. The rise time of the voltage across the load is therefore determined by the switching time of the reactor, which is very fast, and the capacity across the load. The rise time of the driving pulse is not a factor for the action of the reactor prevents the load from seeing it. This invention essentially translates time of rise of a pulse into time delay. The latter is easily compensated for in transmitters.

It is an object of this invention to provide a saturable reactor to decrease the rise time of a pulse.

It is a further object of the present invention to translate the time of rise of a pulse into time delay.

The various features of novelty which characterize this invention are pointed out with particularity in the claim annexed to and forming a part of this specification. A better understanding of the advantages, specific objects obtained with use of, and many of the attendant advantages of this invention will be readily appreciated as the same becomes better understood by reference to the following detailed description when considered in connection with the accompanying drawing in which like reference numerals designate like parts throughout the figure thereof and wherein:

The single figure shows a schematic diagram illustrating a preferred form of the invention.

In order to better understand the operation of the system described in the figure, a description of the components referred to is first presented. A tube 1 such as a triode or a transistor may be used is connected to a source of power 3. A source of pulses $E_D$ is connected to the grid of the tube 1 so that said pulses are amplified and applied saturable reactor L. Saturable reactor L has a load winding 5 and a reset winding 7. Saturable reactor L is of the self saturating square hysteresis type and is connected to the load 9 to supply a turn on pulse $E_L$. The load 9 may be any electron device such as a microwave generator, amplifying tube, magnetron, etc. The turn on pulse $E_L$ may be applied to the cathode of the emitter end of such devices or may be applied to a control element in the device to accomplish activation of the devices.

*Operation*

A grid driving voltage pulse $E_D$ is applied to the grid of tube 1. Tube 1 will now tend to have an output of the same wave form as that of the driving pulse. However this will not be seen by the load 9 as most of the voltage drop will be across the reactor L when it is not saturated as the reactor has a relative high impedance in its unsaturated condition. The reactor L will stay in its high impedance state until sufficient current flows there through to cause the reactor to saturate. The reactor L is of the self saturating type having a reset winding 7 to bring the reactor back to a predetermined flux level after firing. The reactor fires or saturates at time $T_1$ which ideally would be the time the driving pulse $E_D$ reaches the end of its rise time. When the reactor fires its impedance becomes relatively small in a very short span of time. This results in a pulse $E_L$ having a smaller rise time than that of pulse $E_D$. This is the pulse that is applied to the load 9.

The rise time of the switch grid driving voltage $E_D$ is 1.5 microseconds, 0 to 100%. The rise time across the load 9 is approximately 0.5 microsecond in this example. Had the $E_D$ pulse been longer the shape of $E_L$ would have been more clearly defined, but the enhancement of the rise time is quite obvious. There is a slight ramp of $E_L$ between $t_0$ and $t_1$. This is unavoidable as the reactor L must pass some current in order to saturate. Its magnitude is proportional to the ratio of the impedance of L unsaturated and the impedance of the load 9. However in most practical cases a small ramp such as the one in $E_L$ will not have any appreciable effect on the load 9.

On minor effect has been noted. The reactor inserts a time delay between generator 3 and load 9 at the start of the pulse. Once saturated however it merely is a pass element for the driving pulse. The overall effect is a delay in the start of $E_L$ but no delay in the stopping of $E_L$; therefore resulting in a shortening of the $E_L$ pulse when compared with $E_D$. Such shortening, however, is easily compensated for in the driving circuits.

The use of saturable reactors in pulse modulators has been restricted to either full magnetic modulators which achieve sharp pulses by cascading reactors, or the use as a series hold off switch to prevent excessive internal dissipation in the main switch element of a line type pulser.

*Advantages*

The advantages of the application of a saturable reactor disclosed here are several:

(1) Wide band amplifiers driving a hard switch are no longer required. Therefore, fewer stages may be used for the same gain-bandwidth product.

(2) The high frequency response of pulse transformers becomes less critical to circuit designs.

(3) Fast rise times in line type modulators are no longer required. This eliminates much of the difficult work usually required to stop such circuits from ringing.

(4) The reactor can be applied in hard switch driving circuitry thereby reducing on time of the switch and internal switch element average power dissipation.

While in accordance with the provisions of the statutes, I have illustrated and described the best forms to the invention now known to me, it will be apparent to those skilled in the art that changes may be made in the form of the apparatus disclosed without departing from the spirit of the invention as set forth in the appended claim, and that in some cases certain features of the invention may sometimes be used to advantage without a corresponding use of other features. Accordingly, I desire the scope of my invention to be limited only by the appended claim.

I claim:

A pulse shaper for enhancing the rise time of a pulse comprising a source of power voltage having first and second terminals, a tube having an anode, cathode, and a control grid, said cathode being connected to the first terminal of said source of power voltage, a self saturating reactor of the square hysteresis type having a load winding and a reset winding, said self saturating reactor having a short switching time, one end of said load winding of the reactor being connected to said anode of said tube, the other end of said self saturating reactor being connected to one side of a load circuit which presents substantial amounts of capacity to the source of power voltage, the other side of said load circuit being connected to said second terminal of said source of power voltage, and a source of grid driving pulses having an appreciable rise time connected to the control grid of said tube whereby said self saturating reactor will be in an unsaturated state during the rise and off times of each pulse of said source of grid driving pulses, and wherein an output pulse presented to the load circuit will, due to the short switching time of the self saturating reactor, have a shorter rise time than the rise time of said source of grid driving pulses.

References Cited by the Examiner

UNITED STATES PATENTS

| | | |
|---|---|---|
| 2,591,406 | 4/1952 | Carter et al. |
| 2,882,482 | 4/1959 | Simkins. |
| 2,909,659 | 10/1959 | Woo. |
| 2,994,003 | 7/1961 | Einsele et al. _____ 307—88.5 |
| 3,081,409 | 3/1963 | Adelaar _____ 307—88 X |
| 3,084,263 | 4/1963 | Van der Weg et al. ____ 307—88 |
| 3,163,774 | 12/1964 | Tulp et al. _____ 307—88.5 |
| 3,193,693 | 7/1965 | Daykin _____ 307—88 |

ARTHUR GAUSS, *Primary Examiner.*

I. C. EDELL, *Assistant Examiner.*